(12) United States Patent
Bergström et al.

(10) Patent No.: US 11,503,552 B2
(45) Date of Patent: Nov. 15, 2022

(54) INDICATION OF MULTIPLE POWER CLASSES

(71) Applicant: Telefonaktiebolaget LM Ericsson (publ), Stockholm (SE)

(72) Inventors: Mattias Bergström, Sollentuna (SE); Muhammad Kazmi, Sundbyberg (SE); Håkan Palm, Växjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 120 days.

(21) Appl. No.: 16/957,746

(22) PCT Filed: Feb. 11, 2019

(86) PCT No.: PCT/EP2019/053251
§ 371 (c)(1),
(2) Date: Jun. 25, 2020

(87) PCT Pub. No.: WO2019/158461
PCT Pub. Date: Aug. 22, 2019

(65) Prior Publication Data
US 2021/0092690 A1 Mar. 25, 2021

Related U.S. Application Data

(60) Provisional application No. 62/630,890, filed on Feb. 15, 2018.

(51) Int. Cl.
*H04W 52/34* (2009.01)
*H04W 72/04* (2009.01)

(52) U.S. Cl.
CPC ....... *H04W 52/34* (2013.01); *H04W 72/0473* (2013.01)

(58) Field of Classification Search
CPC ............. H04W 52/34; H04W 72/0473; H04W 52/367; H04W 52/146; H04W 52/28
See application file for complete search history.

(56) References Cited

U.S. PATENT DOCUMENTS

| 2006/0286994 A1* | 12/2006 | Kwak | H04W 52/367 455/522 |
| 2010/0285828 A1* | 11/2010 | Panian | H04W 52/36 455/522 |
| 2011/0081934 A1* | 4/2011 | Imamura | H04W 52/367 455/522 |

FOREIGN PATENT DOCUMENTS

| GB | 2411547 A | 8/2005 |
| WO | 2015093746 A1 | 6/2015 |
| WO | 2017211406 A1 | 12/2017 |

OTHER PUBLICATIONS

PCT International Search Report and Written Opinion dated Apr. 16, 2019, for International Application No. PCT/EP2019/053251, 10 pages.

(Continued)

*Primary Examiner* — Steven H Nguyen
(74) *Attorney, Agent, or Firm* — Sage Patent Group

(57) ABSTRACT

A wireless device that indicates multiple power classes to a network node, a network node that uses the indicated multiple power classes, and related methods of operation for the wireless device and the network node are disclosed. The disclosed embodiments aim at an increase flexibility in setting different power classes in different communication scenarios while reducing signalling overhead for capability signalling for the wireless device. This is achieved by using at least one set of power classes defining at least two power classes of the wireless device. Each set of power classes applies to a transmission band (A, B, C) supported by the wireless device and each power class in each set of power (Continued)

classes applies to a specific operative condition of the wireless device.

18 Claims, 6 Drawing Sheets

(56) References Cited

OTHER PUBLICATIONS

RAN4, 3GPP TSG RAN WG2#101 Meeting #85, R2-1801728, R4-1714017, "LS on the Addition of PC2 for Uplink CA_41C", Athens, Greece, Feb. 26-Mar. 2, 2018, 1 page.
European Office Action Communication for European Patent Application No. EP 19704612.1 dated Sep. 1, 2021, 8 pages.

* cited by examiner

|  | Band A | Band B | Band C |
|---|---|---|---|
| Default power classes | 23 dBm | 23 dBm | 26 dBm |
| Modified power classes |  |  | 20 dBm |

FIG.3

|  | Band A | Band B | Band C |
|---|---|---|---|
| Default power classes | 23 dBm | 23 dBm | 26 dBm |
| Modified power classes | NULL | NULL | 20 dBm |

FIG. 4

|  | Band A | Band B | Band C |
|---|---|---|---|
| Default power classes | 23 dBm | 23 dBm | 26 dBm |
| Modified power Classes | 23 dBm | 23dBm | 20 dBm |

FIG. 5

INDICATION OF MULTIPLE POWER CLASSES

CROSS-REFERENCE TO RELATED APPLICATIONS

This application is a 35 U.S.C. § 371 national stage application for International Application No. PCT/EP2019/053251, entitled "INDICATION OF MULTIPLE POWER CLASSES", filed on Feb. 11, 2019, which claims the benefit of U.S. Provisional Application No. 62/630,890 filed on Feb. 15, 2018, the disclosures and contents of which are hereby incorporated by reference in their entireties.

TECHNICAL FIELD

The present invention relates to a wireless device indicating multiple power classes to a network node, a network node using the indicated multiple power classes, and related methods of operation for the wireless device and the network node.

BACKGROUND

Generally a power class is used in relation to the operation of a wireless device of any type, e.g., user equipment used in wireless networks. A power class PC defines the maximum output power of the wireless device within a given channel bandwidth. The maximum output power is measured or estimated over a measurement period. The measurement period comprises one or more time resources. Examples of time resources are sub frame (1 ms), time slot, TTI, shortened TTI (sTTI), mini-slot, mini-subframe etc.

Further, the output power of the wireless device can be estimated or measured at the antenna connector of the wireless device, e.g., conducted output power, or it can be estimated or measured over the air, e.g., as over the air OTA output power. The OTA maximum output power can therefore be expressed in terms of total radiated power (TRP) and Effective Isotropic Radiated Power (EIRP).

Further, the maximum output power is interchangeably also called as maximum transmit power, nominal maximum output power, peak output power etc. While the maximum output power is associated with certain tolerance or accuracy level the power class of a wireless device is the maximum power of the wireless device specified without taking into account the tolerance.

Further, a wireless device may indicate the power class for each band and each band combination used by the wireless device during wireless communication.

Here, the wireless device capabilities may be different depending on the used band combination and hence there are some capability parameters for the wireless which need to be indicated per band combination to a radio access network of a wireless network.

Thus, depending on which band combination the wireless device is currently using the power class may be different for per band and per band combination used by the wireless device. For example, if the wireless device uses a band combination with contains multiple carriers the power class may be lower compared to the case in which a single carrier is used.

However, to indicate the power class per band per band combination may consume a lot of signaling overhead if the number of band combinations is high. As a result the upper limit of the size of the capability signaling may be exceeded and the wireless device may not send information about all the supported band combinations.

Further, when the power class depends on what features are enabled at the wireless device—e.g. depends on whether MIMO is enabled or not—the amount of signaling overhead may increase even more.

SUMMARY

In view of the above, the object of the present invention is to increase flexibility in setting different power classes in different communication scenarios while minimizing signalling overhead for capability signalling for the wireless device.

According to a first aspect of the present invention there is provided a wireless device configured to communicate with a network node. The wireless device comprises a processing circuitry which determines at least one set of power classes defining at least two power classes of the wireless device. Each set of power classes applies to a transmission band supported by the wireless device and each power class in each set of power classes applies to a specific operative condition of the wireless device. Further, the processing circuitry generates an indication message for indication of the at least one set of power classes. The wireless device also comprises a radio interface which transmits the indication message to the network node.

According to a second aspect of the present invention there is provided a network node configured to communicate with the wireless device according to the first aspect of the present invention. The network node comprises a radio interface which receives an indication message from the wireless device. The indication message indicates at least one set of power classes defining at least two power classes of the wireless device.

Further, each set of power classes applies to a transmission band supported by the wireless device and each power class in each set of power classes applies to a specific operative condition of the wireless device. A processing circuitry of the network node uses the information provided by the indication message for performing at least one operation in the network node.

According to a third aspect of the present invention there is provided a method of indicating multiple power classes from a wireless device according to the first aspect of the present invention to a network node according to the second aspect of the present invention. Here, the method comprises a step of determining at least one set of power classes defining at least two power classes of the wireless device. Each set of power classes applies to a transmission band supported by the wireless device and each power class in each set of power classes applies to a specific operative condition of the wireless device. Further, the method comprises a step of generating an indication message for indication of the at least one set of power classes to the network node and a step of transmitting the indication to the network node. According to a fourth aspect of the present invention there is provided a method of receiving multiple power classes from a wireless device according to the first aspect of the present invention at a network node according to the second aspect of the present invention. The method comprises a step of receiving an indication message from the wireless device indicating at least one set of power classes defining at least two power classes of the wireless device. Each set of power classes applies to a transmission band supported by the wireless device and each power class in each set of power classes applies to a specific operative condition of the wireless device. Further the method comprises a step of performing at least one operation in the network node using the information provided by the indication message.

According to a fifth aspect of the present invention there is provided a computer program, comprising instructions which, when executed on at least one processor, cause the at least one processor to carry out the method according to the third aspect or the fourth aspect of the present invention.

According to a sixth aspect of the present invention there is provided a carrier containing the computer program according to the fifth aspect, wherein the carrier is one of an electronic signal, optical signal, radio signal, or computer readable storage medium.

BRIEF DESCRIPTION OF DRAWINGS

Examples of the present invention will be explained in the following with reference to the drawing in which

FIG. 3 shows a first example of signalling to report power classes for different transmission bands;

FIG. 4 shows a second example of signalling to report power classes for different transmission bands;

FIG. 5 shows a third example of signalling to report power classes for different transmission bands;

DETAILED DESCRIPTION

Figure 1:
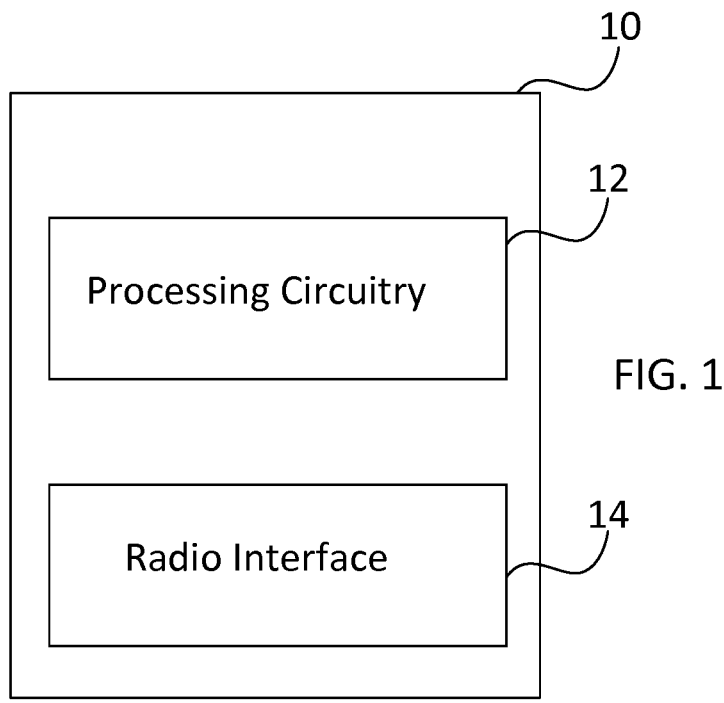
FIG. 1 shows a schematic diagram of a wireless device according to the present invention.

Different aspects of power classes as applicable within the frame work of the present invention will be explained in the following. E.g., examples of power classes for wireless devices in LTE are power class 1 (PCI), power class 2 (PC2), power class 3 (PC3), power class 5 (PC5) and power class 6 (PC6) corresponding to maximum output power of 31 dBm, 26 dBm, 23 dBm, 20 dBm and 14 dBm respectively. More power classes can be introduced for wireless devices in LTE in the future. Further, examples of power classes for wireless devises in NR are power class 3 (PC3) corresponding to 23 dBm for frequency range 1 (FR1) and a power class corresponding to EIRP of 43 dBm for frequency range 2 (FR2). Another example of a power class for a wireless device in FR2 correspond to sEIRP of 43 dBm. Examples of FR1 is any frequency below 6 GHz. Examples of FR2 is any frequency between 6 GHz and 52.6 GHz. In FR1 the UE power is estimated at the antenna connector of the UE, whereas in FR2 the UE power is estimated over the air (OTA). More power classes for wireless devices can also be introduced in NR in future.

Further, the terms lower power wireless device or UE (LPUE) or lower UE power class, medium power wireless device or UE (MPUE) or normal power wireless device or UE or medium wireless device or UE power class, higher power wireless device pf UE (HPUE) or higher wireless device or UE power class etc. are also used. Examples of LPUE are PC5 and PC6 class. Examples of MPUE are PC3 and EIRP of 43 dBm (for FR2 in NR). Examples of HPUE are PCI and PC2. MPUE is the most common and usual UE power class.

The present invention to be explained in the following is applicable to any wireless device power class (which can be conducted or OTA such as TRP and/or EIRP) for transmitting signals in any frequency range even beyond FR2.

Further, the present invention is also applicable to the concept of reduced/limited power classes as explained in the following. Further, the same power class may be applicable for one or multiple bands supported by a wireless device. For example, the wireless device may support LTE PC3 for LTE band 25 (1900 MHz), LTE band 41 (2.6 GHz), NR band n41 (2.6 GHz), LTE band 5 (850 MHz), LTE band 26 (850 MHz) etc. These bands provide different cell coverage. E.g., band 25 has 3.5 dB worse coverage than band 26 or band 5; band 41 or band n41 has around 5 dB worse coverage than band 26 or band 5. The base station operating bands 41 or band n41 and the base station operating band 5 or band 26 can be co-located at the same physical site or even the same base station may operate multiple bands. To avoid coverage holes due to higher bands (e.g. band 25, band 41/n41) the network operator has to deploy extra base station sites.

Here, an option is that the wireless supports selected power classes, i.e. at least the higher power class for bands with worse coverage (i.e. with higher frequency). Yet another solution is that the wireless supports both normal and high UE power classes (e.g. PC2 (26 dBm) and PC3 (23 dBm)) for higher frequency bands while it supports only normal power class (e.g. PC3) for lower frequency bands (e.g. band 5, band 26 etc). The latter approach allows the operator to configure the wireless device with normal power class (e.g. PC3) even in higher bands to save wireless device power, e.g., when the wireless device is close to the base station.

Yet another aspect of the present invention to be discussed in the following relates to wireless device capability signaling and use of different band combination.

Generally, a wireless device may indicate the power class for the wireless device for each band in each band combination.

Also, a wireless device may support a certain set of bands. E.g., in carrier aggregation the wireless device may use multiple carriers at the same time e.g. 2 DL and 1 UL carriers, 5 DL carriers and 2 UL carriers etc. These carriers may be in multiple bands. The wireless device may not be capable of supporting carriers in all bands at one point in time due to limitations in the wireless device. To ensure that the network node (e.g. eNB, gNodeB, etc) does not configure more carriers for the wireless device than the wireless can support the concept of supported band combinations is used where the wireless can indicate a set of combinations of those bands the wireless device can support. For example, if the wireless device supports the bands A, B and C, the wireless device may not support carrier aggregation between all those bands in all combinations, for example the wireless device may support carrier aggregation between different carriers in band A, and between carriers in band A and band C, and between carriers in band B and C, but not between band A and B and also not between all of these three bands, etc. Further, the existing signaling, e.g. in LTE, in NR etc.

allows the wireless device to indicate exactly those combinations which the wireless device supports.

The wireless device capabilities may be different depending on which band combination is used hence there are some capability parameters for the wireless which are indicated per band combination. For example, the wireless device ability/capability to perform MIMO in a band may be different depending on which band combination the wireless device uses and hence this is indicated per-band-per-band combination.

Further, in examples of the present invention to be described in the following a generic terminology wireless device or UE is used. The wireless device or UE herein can be any type of wireless device capable of communicating with network node or another wireless device or UE over radio signals. The wireless device may also be radio communication device, target device, device to device (D2D) UE, V2X UE, machine type UE or UE capable of machine to machine communication (M2M) or MTC, a sensor equipped with UE, Tablet, mobile terminals, smart phone, laptop embedded equipped (LEE), laptop mounted equipment (LME), USB dongles, Customer Premises Equipment (CPE) etc.

Further, in examples of the present invention to be described in the following a generic terminology network node is used. It can be any kind of network node which may comprise of a radio network node such as base station, radio base station, base transceiver station, base station controller, network controller, multi standard radio BS, gNB, NR BS, evolved Node B (eNB), MeNB, SeNB, SgNB, MgNB, Node B, Multi-cell/multicast Coordination Entity (MCE), relay node, access point, radio access point, Remote Radio Unit (RRU) Remote Radio Head (RRH), a multi-standard BS (a.k.a. MSR BS), a core network node (e.g., MME, SON node, a coordinating node, positioning node, MDT node, etc.), or even an external node (e.g., 3rd party node, a node external to the current network), etc. The network node may also comprise a test equipment. The term "BS" may comprise, e.g., gNB, ng-eNB, or en-gNB described in 3GPP TS 38.300 and 3GPP TS 37.340, or a relay node, or any BS compliant with the embodiments. Further, examples as described in the following are applicable to single carrier as well as to multicarrier operation of the wireless device or UE. Examples of multicarrier operation of the UE are carrier aggregation CA and multi-connectivity MC. In CA the UE is able to receive and/or transmit data to more than one serving cells. Dual Connectivity DC is a special case or example of MC. The DC comprises one main cell group MCG containing at least PCell and one secondary cell group SCG containing at least SCell. The term carrier aggregation CA is also called (e.g. interchangeably called) "multi-carrier system", "multi-cell operation", "multi-carrier operation", "multi-carrier" transmission and/or reception. In CA one of the component carriers CCs is the primary component carrier PCC or simply primary carrier or even anchor carrier. The remaining ones are called secondary component carrier SCC or simply secondary carriers or even supplementary carriers. The serving cell is interchangeably called as primary cell PCell or primary serving cell PSC. Similarly the secondary serving cell is interchangeably called as secondary cell SCell or secondary serving cell SSC. In one example of DC operation involving E-UTRA and NR, the E-UTRA is the master. In another example of the DC operation involving E-UTRA and NR, NR is the master. The DC operation may also involve only NR serving cells, e.g., NR PCell, NR PSCell and NR SCells, or L T.TTEF serving cells, e.g., LTE PCell, LTE PSCell and LTE SCells.

In view of the general outline given above, in the following different examples of the present invention will be explained.

Generally, according to the present invention the wireless device indicates for a band, a set of power classes, e.g., PC2 and PC3. These different power classes would be indicated in different fields of a capability report message forwarded from thee wireless device to the network node and each field will be associated to a particular operative scenario of the wireless device. Examples of operative scenarios are number of carriers configured in the multicarrier operation of the wireless device, transmit and/or receive antenna configuration of the wireless device, e.g. MIMO configuration, combination of carriers and antenna configuration etc.

E.g., the wireless device may determine the applicable power class of the wireless device for a band for a particular operative scenario and provide the information about the determined power class in an associated field of the capability report message to the network node. The network node can then know which particular power class is applicable for the wireless device in a particular operative scenario by inspecting the corresponding fields. The network node uses the received information about the wireless device power class for performing one or more operations, e.g., configuring the wireless with an appropriate power class or power level, scheduling of signals, conducting power control, etc.

In the following different examples and embodiments of the present invention will be explained in more detail with reference to the drawings.

FIG. 1 shows a schematic diagram of a wireless device according to the present invention.

As shown in FIG. 1, the wireless device 10 according to the present invention comprises a processing circuitry 12 and a radio interface 14.

Operatively the processing circuitry 12 is adapted to determine at least one set of power classes defining at least two power classes of the wireless device. Each set of power classes applies to a transmission band supported by the wireless device and each power class in each set of power classes applies to a specific operative condition of the wireless device.

Further, operatively the processing circuitry 12 is adapted to generate an indication message for indication of the at least one set of power classes.

Figure 2:
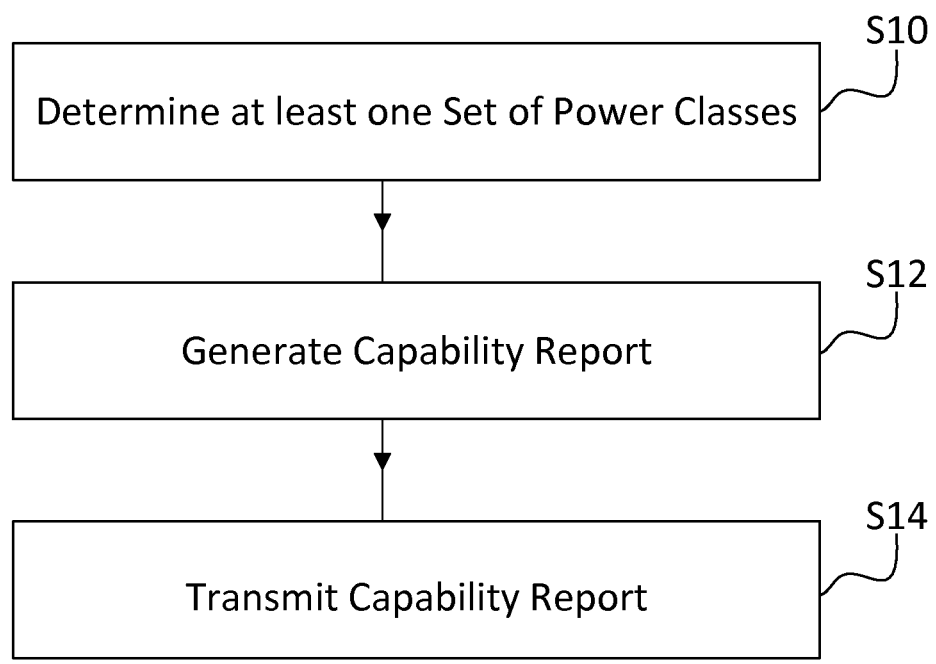
FIG. 2 shows a flowchart of operation of the wireless device shown in FIG. 1.

Further, operatively the radio interface 14 is adapted to transmit the indication message to the network node. FIG. 2 shows a flowchart of operation of the wireless device shown in FIG. 1.

As shown in FIG. 2, the wireless device 10 executes a method of indicating multiple power classes from a wireless device to a network node communicating with the wireless device 10.

As shown in FIG. 2, in a step S10, operatively executed by the processing circuitry 12, there is determined at least one set of power classes defining at least two power classes of the wireless device 10. Each set of power classes applies to a transmission band supported by the wireless device 10 and each power class in each set of power classes applies to a specific operative condition of the wireless device 10.

As shown in FIG. 2, in a step S12, operatively executed by the processing circuitry 12, there is generated an indication message for indication of the at least one set of power classes to the network node. Preferably, the indication message may be a capability report message.

As shown in FIG. 2, in a step S14, operatively executed by the radio interface 14, the indication message is transmitted to the network node.

In view of FIG. 2 according to the present invention the wireless device 10 indicates multiple power classes for a certain band. It should be noted that while in some cases two power classes are considered, the invention can be used in a generic manner for any number of power classes which are applicable depending on conditions.

The wireless device 10 would determine a first and a second power class applicable for the wireless device 10 for a certain band for the wireless device 10. Whether the first or the second power class is applicable depends on certain conditions.

For example the first power class may be applicable if the wireless device 10 uses only a single carrier and may herein be referred to as the original power class or default power class while the second power class is applicable if the UE uses multiple carriers and would herein be referred to as the modified power class or for some examples as limited power class.

The term a carrier or multiple carrier used herein may refer to the number of carriers configured at the wireless device 10 for performing an operation, which requires the wireless device 10 to apply its transmit power e.g. transmit signals with the power on the configured carrier (s).

Examples of operations are transmission of signals on a cell on a single carrier, e.g. PCell etc., transmission of signals on two or more cells on two or more carriers, e.g. PCell, SCell, PSCell on carriers PCC, SCC and PSC respectively etc.

The term cell herein may refer to a serving cell operating on a carrier frequency, e.g. PCC, SCC etc, which belong a particular frequency band, e.g. 700 MHz such as LTE band 28 or NR band n28 etc. Specific examples of operation involving multiple carriers are carrier aggregation, multi-connectivity, dual connectivity, E-UTRA-NR dual connectivity (EN-DC) etc.

The wireless device 10 can be configured to perform certain operation based on one or more of the following: information or configuration message received from a network node, pre-defined rule and autonomously by the wireless device 10.

It should be noted that while in some example reference is made to the different power classes as limited the invention is applicable also in case, the applicable power class for the UE is actually extended compared to the original power class, but in order to explain the methods herein in some examples of the present invention scenarios are described where the wireless device 10 has an original power class and (one or more) limited power class (es).

It should be noted though that the applicability of the power class may also depend on other conditions or scenarios. Examples of other conditions or scenarios are number of carriers involved in the operation, antenna configuration used by the wireless device 10 etc. Examples of antenna configuration are MIMO operation, number of DL and/or UL antennas in the MIMO configuration used by the network node for the UE operation etc. For example the first power class is applicable if the UE uses less than threshold number of carriers (e.g. three carriers), but otherwise the second power class is applied. In another example the first power class is applicable if the wireless device 10 is not configured with MIMO, while the second power class is applicable if the wireless device 10 is configured with MIMO.

In yet another example the first power class is applicable if the wireless device 10 is configured with the MIMO configuration not larger than certain MIMO threshold, e.g. 2 transmit and 2 receive antennas, while the second power class is applicable if the wireless device 10 is configured with MIMO configuration larger than certain MIMO threshold.

In yet another example the first power class is applicable if the UE is configured with certain set of combinations of carriers and antenna configuration, while the second power class is applicable if the UE is configured with another set of combinations of carriers and antenna configuration.

For example if the wireless device 10 is configured with MIMO configuration comprising not more than 2 DL and 2 UL antennas, and with not more than 2 carriers; but otherwise the second power class is applicable, i.e. MIMO configuration is more than 2×2 and/or number of carriers is more than 2.

It would also be possible that more than two power classes are indicated for a band. For example: if the wireless device 10 is configured with a single carrier and not configured with MIMO, a first power class is applicable, while if the wireless device 10 is configured with multiple carriers and not configured with MIMO, a second power class is applicable, this may then be referred to a first limited power class while if the wireless device 10 is configured with multiple carriers and configured with MIMO, a third power class is applicable, this power class may then be referred to as a second limited power class.

In the following different ways of determining and signalling the at least one set of power classes defining at least two power classes will be described with reference to FIGS. 3 to 5.

Heretofore, there are described examples of the present invention where the wireless device 10 supports a plurality of transmission bands. However, it should be understood the present invention is also applicable to a case where only one transmission band is supported.

FIG. 3 shows a first example of signalling to report power classes for different transmission bands. Without loss of generality it is assumed that power class differentiation applies to transmission band C and does not apply to transmission band A and B.

As shown in FIG. 3, for the transmission band C where power class differentiation does apply the set of power classes, the processing circuit 12 is adapted to execute step S10 such that the set of power classes is a set comprising a default power class, e.g., 26 dBm, and a modified power class, e.g., 20 dBm.

As shown in FIG. 3, for those transmission bands A and B where power class differentiation does not apply the processing circuit 12 is adapted to execute step S10 such that the set of power classes comprises a single default power class, 23 dBm.

As shown in FIG. 3, in case it is only for certain bands the power class may be different considering certain conditions the wireless device 10 may indicate multiple power classes only for those bands. For example, if the wireless device 10 supports band A, B and C and the original power class for band A and the original power class for band B always apply, while for band C the original power class does not always apply and hence the wireless device 10 has a modified power class for band C, the wireless device 10 may only indicate a modified power class for band C, but not for band A and for band B. This has the benefit that signaling can be reduced since no additional indications are needed for band A and for band B.

FIG. 4 shows a second example of signalling to report power classes for different transmission bands. Without loss of generality it is again assumed that power class differentiation applies to transmission band C and does not apply to transmission band A and B.

As shown in FIG. 4, for the transmission band C where power class differentiation does apply the processing circuit 12 is adapted to execute step S10 such that the set of power classes is again a set comprising a default power class, e.g., 26 dBm, and a modified power class, e.g., 20 dBm.

However, as shown in FIG. 4 for those transmission bands A and B where power class differentiation does not apply the processing circuit 12 is adapted to execute step S10 such that the set of power classes comprises a default power class, e.g., 23 dBm, and at least one dummy power class NULL.

The example shown in FIG. 4 serves to handle a case where, depending on the signaling, to omit indications for some bands may require some additional complexity in the wireless device 10 and in the network node 22, e.g. eNB, gNB etc. For example if the "limited power classes" are provided as a list and since the list would be empty for Band A and Band B and hence it needs to be understood which bands the limited power class (es) apply to, i.e. in the above example that the 20 dBm power class applies to Band C.

Thus, another approach illustrated in FIG. 4 is that the wireless device 10 indicates a dummy- or null-value for bands for which no limited power class applies. An example is shown below in table 2. This resolves the complexity-issue.

FIG. 5 shows a third example of signalling to report power classes for different transmission bands. Without loss of generality it is again assumed that power class differentiation applies to transmission band C and does not apply to transmission band A and

B.

As shown in FIG. 5, for the transmission band C where power class differentiation does apply the processing circuit 12 is adapted to execute step S10 such that the set of power classes is again a set comprising a default power class, e.g., 26 dBm, and a modified power class, e.g., 20 dBm.

However, as shown in FIG. 5 for those transmission bands A and B where power class differentiation does not apply the processing circuit 12 is adapted to execute step S10 such that the set of power classes is a set comprising at least two identical power classes, e.g., 23 dBm.

The third approach shown in FIG. 5 also resolves the complexity-issue discussed with respect to FIG. 4 in that the wireless device 10 indicates the original power class multiple times for a band for which there is no limited power class. With this approach the modified power class is the same as the default power class.

In the following different ways of determining and indication message 16 will be described with reference to FIGS. 6 and 7.

Figure 6:
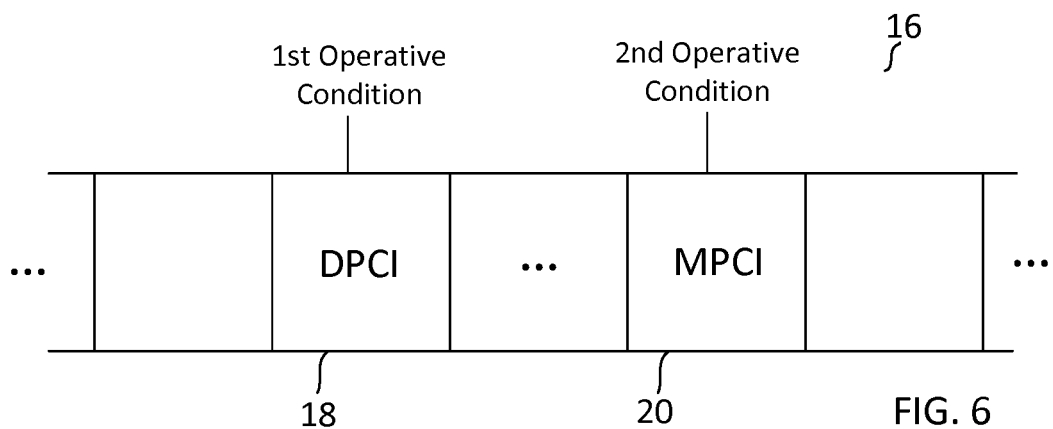
FIG. 6 shows a first example of an indication message having fields for power class indication.

FIG. 6 shows a first example of an indication message 16 having two fields 18, 20 for power class indication.

As shown in FIG. 6, according to the first example the processing circuitry 12 is adapted to execute step S12 such that the indication message is setup according to a specification defining a first field 18 for default power class indication supplemented by a further field 20 is provided for extended power class indication. As shown in FIG. 6, for the first example it is assumed that a first operative condition of the wireless device 10 is associated with the first field 18 and such that one further operative condition, e.g., a second operative condition of the wireless device 10 is associated with the further field 20.

It should be noted that while FIG. 6 shows an example for the indication message having two fields 18, 20 for power class indication the number of such fields may clearly be greater than two.

Figure 7:
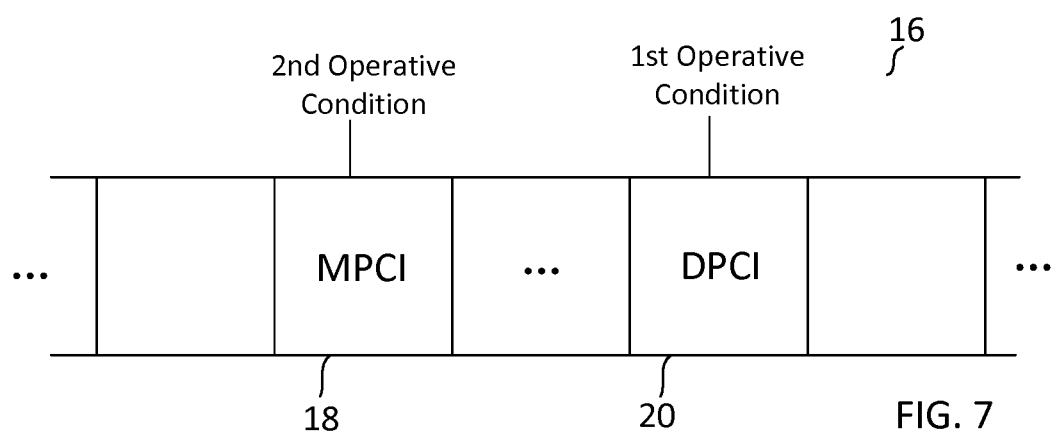
FIG. 7 shows a second example of an indication message having fields for power class indication.

FIG. 7 shows a second example of an indication message 16 having two fields 18, 20 for power class indication.

As shown in FIG. 7, according to the second example the processing circuitry 12 is adapted to execute step S12 such that the indication message is again setup according to a specification defining the first field 18 and at least one further field 20.

As shown in FIG. 7, the second example is different from the first example in that the processing circuitry 12 is adapted to execute step S12 such that the first field 18 is used for extended power class indication and such that the further field 20 is used for default power class indication.

As shown in FIG. 7, the second example is also different from the first example in that the second operative condition of the wireless device 10 is associated with the first field 18 and such that first operative condition is associated with the further field 20.

It should again be noted that while FIG. 7 shows an example for the indication message 16 having two fields 18, 20 for power class indication the number of such fields may clearly be greater than two.

In the following there will be described more specific examples of indication messages 16 according to the present invention. In more detail there will be described alternatives for propagating new and old fields, e.g., in a capability report message as follows: one approach where the wireless device 10 indicates a "limited" power class as the modified power class in a new field, and the "original" power class as the default power class in an old/existing field; and one approach where the wireless device 10 indicates a "original" power class as the default power class in a new field, and the "limited" power class as the modified power class in an old/existing field.

In the following there will be described an example where the limited power class is assigned to the new field and the original power class to the old/exiting field.

The limited power class may be indicated by the wireless device 10 to the network node 22 in the same message as the original power class of the wireless device 10. The wireless device 10 may indicate its original power class for a band, and in addition to this the wireless device 10 may also indicate its limited power class for that band. The wireless device 10 would then determine that, the normal power class of the wireless device 10 would not be applicable in certain cases and hence the wireless device 10 would determine a limited power class would be applicable in such cases.

According to this embodiment the wireless device 10 indicates the wireless device's 10 limited power class in a new field or equivalently in a new message while the original power class is indicated in an old field. It should be understood here that a "new" field is a field added in a later release of the specification compared to an "old" field.

It would be possible that the wireless device 10 does not indicate any limited power class the wireless device 10 supports the original power class regardless of any conditions. An example of such a message is the wireless device capability report. The wireless device capability report can be transmitted by the wireless device 10 to the network node 22, e.g. a base station, a core network node etc. autonomously or in response to receiving a request from the network node 22.

Below is an example of the illustration of how may be implemented where the bold text highlight additions which implements this embodiment of the invention and allows the wireless device 10 to indicate the limited power class and is the power class which the wireless device 10 must use in case for example multiple carriers are used. The example considers two power classes. It should be noted that parts of the message which are not directly relevant for the implementation of this invention have been omitted.

The signalling is implemented as follows: in the UE-EUTRA-Capability-vlxyz a new field is added called rf-Parameters-vlxyz being of the type RF-Parameters-vlxyz containing a field supportedBandListEUTRA-vlxyz of type SupportedBandListEUTRA-vlxyz which is a sequence of the type Supported BandEUTRA-vlxyz and there the new indication is added of the limited power class in a field named ue-PowerClass-Limited-r13. This example can be implemented in RRC specification TS 36.331 for LTE and/or in TS 38.331 for NR as shown in Table 1 below.

This may result in that if the wireless device 10 indicates its original power class in the existing field and the limited power class in a new field, the network node, e.g. eNB, gNB, BS etc., not capable of decoding the new field may assume that the wireless device's 10 power class is the original power class and may further assume that it is applied in all scenarios even if that is not the case.

In one embodiment the wireless device 10 will, in an existing field used for power class reporting, indicate its limited power class while in an additional, new field (or potentially in a new message) indicate its original power class.

For example, in existing LTE capability signaling the wireless device 10 is able to indicate its power class and the wireless device 10 would according to this embodiment

TABLE 1

UE EUTRA Capability IE

```
UE-EUTRA-Capability-v1320-IEs ::= SEQUENCE {
    ce-Parameters-v1320              CE-Parameters-v1320                      OPTIONAL,
    phyLayerParameters-v1320         PhyLayerParameters-v1320                 OPTIONAL,
    rf-Parameters-v1320              RF-Parameters-v1320                      OPTIONAL,
    fdd-Add-UE-EUTRA-Capabilities-v1320    UE-EUTRA-CapabilityAddXDD-Mode-v1320    OPTIONAL,
    tdd-Add-UE-EUTRA-Capabilities-v1320    UE-EUTRA-CapabilityAddXDD-Mode-v1320    OPTIONAL,
    nonCriticalExtension             UE-EUTRA-Capability-v1330-IEs            OPTIONAL
}
UE-EUTRA-Capability-v1xyz-IEs ::= SEQUENCE {
    rf-Parameters-v1xyz              RF-Parameters-v1xyz                      OPTIONAL,
    nonCriticalExtension             SEQUENCE { }     OPTIONAL
}
RF-Parameters-v1320 ::=              SEQUENCE {
    supportedBandListEUTRA-v1320         SupportedBandListEUTRA-v1320
        OPTIONAL,
    supportedBandCombination-v1320       SupportedBandCombination-v1320
        OPTIONAL,
    supportedBandCombinationAdd-v1320    SupportedBandCombinationAdd-v1320
        OPTIONAL,
    supportedBandCombinationReduced-v1320  SupportedBandCombinationReduced-v1320    OPTIONAL
}
RF-Parameters-v1xyz ::=              SEQUENCE {
    supportedBandListEUTRA-v1xyz         SupportedBandListEUTRA-v1xyz
        OPTIONAL,
}
SupportedBandListEUTRA-v1320 ::= SEQUENCE (SIZE
(1..maxBands)) OF SupportedBandEUTRA-v1320
SupportedBandListEUTRA-v1xyz ::= SEQUENCE (SIZE
(1..maxBands)) OF SupportedBandEUTRA-v1xyz
SupportedBandEUTRA-v1310 ::= SEQUENCE {
ue-PowerClass-5-r13 ENUMERATED {supported} OPTIONAL
}
SupportedBandEUTRA-v1320 ::= SEQUENCE {
IntraFreq-CE-NeedForGaps-r13 ENUMERATED {supported} OPTIONAL,
ue-PowerClass-N-r13 ENUMERATED {class1, class2, class4} OPTIONAL
}
SupportedBandEUTRA-v1xyz ::= SEQUENCE {
ue-PowerClass-Limited-r13 ENUMERATED {class1, class2, clas3, class4, class5} OPTIONAL
}
```

In the following the focus will be on examples with the original power class as default power class in the new field and with the limited power class as modified power class in the old/existing field.

In some cases, some network nodes, e.g. eNBs, gNBs, base stations etc., may not support the new signalling described above where the wireless device 10 is able to indicate multiple power classes hence even if a wireless device 10 indicating multiple power classes the network nodes, e.g. eNB, gNBs, base stations etc., may not be able to decode and understand that but rather the network node, e.g., eNB, gNB, BS etc., may only be able to decode the existing field containing power class information.

indicate its limited power class in this field. While the wireless device 10 would indicate its normal/original power class in a new field.

This has some benefits in terms of interoperability between the wireless device 10 and the network nodes, e.g. eNBs, which support this feature and the network nodes, e.g. eNBs which do not support this feature. More specifically, if the wireless device 10 is served by a network node, e.g. eNB, which is not capable of multiple power classes for a wireless device 10 then this network node, e.g. eNB, may not be able to receive information about the multiple power classes supported by the wireless device 10, and may rather only be able to receive the existing power class indications from UEs.

If the wireless device 10 operates according to this embodiment the UE would then indicate its limited power class in the existing power class indication and the network node, e.g. eNB not capable of multiple power classes would assume that the wireless device's 10 power class is the limited power class which can be applied in all cases. While if the wireless device 10 is served by a network node, e.g. eNB, which supports signalling of multiple power classes, that network node, e.g. eNB, could know that in cases when the limited power class is not currently applicable, the original power class of the wireless device 10 is supported.

Another way of looking at this is that the wireless device 10 indicates in a new field an extended power class which can be applied except when some conditions are fulfilled, new signaling related to additional power classes would not know the wireless device's 10 power class is more than it is in some situations.

In the following an example of how this can be implemented in the specifications (e.g. TS 36.331 or TS 38.331) is provided below where the bold text highlight additions which implements this embodiment of the present invention. The example considers two power classes. It should be noted that parts of the message which are not directly relevant for the implementation of this invention have been omitted.

The signaling is implemented as follows: in the UE-EUTRA-Capability-vlxyz a new field is added called rf-Parameters-vlxyz being of the type RF-Parameters-vlxyz containing a field supportedBandListEUTRA-vlxyz of type SupportedBandListEUTRA-vlxyz which is a sequence of the type SupportedBandEUTRA-vlxyz and there the new indication is added of the extended power class in a field named ue-PowerClass-Extended-r13, as shown in Table 2 below.

TABLE 2

UE EUTRA Capability IE

```
UE-EUTRA-Capability-v1320-IEs ::= SEQUENCE {
    ce-Parameters-v1320              CE-Parameters-v1320                    OPTIONAL,
    phyLayerParameters-v1320         PhyLayerParameters-v1320               OPTIONAL,
    rf-Parameters-v1320              RF-Parameters-v1320                    OPTIONAL,
    fdd-Add-UE-EUTRA-Capabilities-v1320    UE-EUTRA-CapabilityAddXDD-Mode-v1320    OPTIONAL,
    tdd-Add-UE-EUTRA-Capabilities-v1320    UE-EUTRA-CapabilityAddXDD-Mode-v1320    OPTIONAL,
    nonCriticalExtension             UE-EUTRA-Capability-v1330-IEs          OPTIONAL
}
UE-EUTRA-Capability-vlxyz-IEs ::= SEQUENCE {
    rf-Parameters-vlxyz              RF-Parameters-vlxyz                    OPTIONAL,
    nonCriticalExtension             SEQUENCE { }        OPTIONAL
}
RF-Parameters-v1320 ::=              SEQUENCE {
    supportedBandListEUTRA-v1320         SupportedBandListEUTRA-v1320
    OPTIONAL,
    supportedBandCombination-v1320       SupportedBandCombination-v1320
    OPTIONAL,
    supportedBandCombinationAdd-v1320    SupportedBandCombinationAdd-v1320
    OPTIONAL,
    supportedBandCombinationReduced-v1320    SupportedBandCombinationReduced-v1320    OPTIONAL
}
RF-Parameters-vlxyz ::=              SEQUENCE {
    supportedBandListEUTRA-vlxyz         SupportedBandListEUTRA-vlxyz
    OPTIONAL,
}
SupportedBandListEUTRA-v1320 ::= SEQUENCE (SIZE
(1..maxBands)) OF SupportedBandEUTRA-v1320
SupportedBandListEUTRA-vlxyz ::= SEQUENCE (SIZE
(1..maxBands)) OF SupportedBandEUTRA-vlxyz
SupportedBandEUTRA-v1310 ::= SEQUENCE {
ue-PowerClass-5-r13 ENUMERATED {supported} OPTIONAL
}
SupportedBandEUTRA-v1320 ::= SEQUENCE {
IntraFreq-CE-NeedForGaps-r13 ENUMERATED {supported} OPTIONAL,
ue-PowerClass-N-r13 ENUMERATED {class1, class2, class4} OPTIONAL
}
SupportedBandEUTRA-vlxyz ::= SEQUENCE {
ue-PowerClass-Extended-r13 ENUMERATED {class1, class2, clas3, class4, class5} OPTIONAL
}
``` e.g. except if multiple carriers are used. The wireless device 10 would in the existing fields of the signaling indicate the power class which always can be used, e.g., regardless of any conditions.

In case more than two power classes are applicable for a band (and which one is applicable in a specific situation may depend on conditions as described above), the wireless device 10 may indicate the most limited power class or the lowest power class in the original field. This has the benefit that a network node, e.g. eNB, which does not support any In all the above examples the network node, e.g. eNB, gNB etc., upon receiving the information about the power class of the wireless device 10 for performing one or more tasks or operations related to the wireless device 10.

Examples of these tasks will be described in more detail in the following and are: storing the information and using it in a future time, transmitting the received information to another network node, e.g. neighboring BS, core network node etc., adapting the scheduling of signals to the wireless device 10 in UL and/or DL, adapting the wireless device 10 maximum power, e.g. configuring the max power of the wireless device 10, adapting the wireless device 10 antenna configuration, e.g. maximum UL transmit antennas, adapting the CA configuration, e.g. increasing or reducing the number of carriers, adapting the MC or DC configuration, e.g. increasing or reducing the number of carriers in MCG and/or in SCG etc. Having described details of the indication message in the following a more detail explanation of the structure and operation of the network node 22 will be given.

Figure 8:
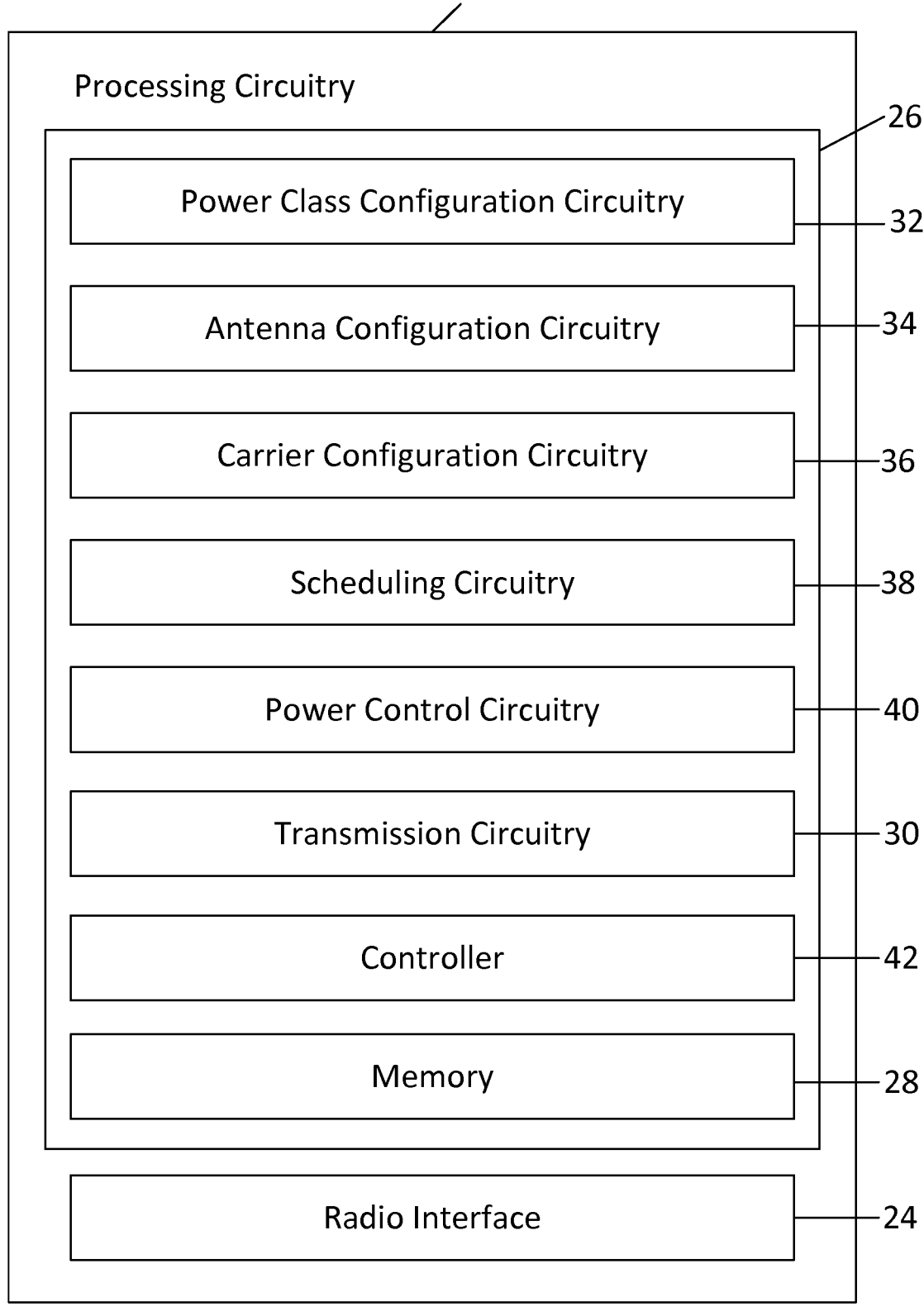
FIG. 8 shows a schematic diagram of a network node according to the present invention.

FIG. 8 shows a schematic diagram of a network node 22 according to the present invention which is configured to communicate with the wireless device (10).

As shown in FIG. 8, the network node 22 comprises a radio interface 24 adapted to receive the indication message 16 from the wireless device (10) indicating at least one set of power classes defining at least two power classes of the wireless device 10, as explained above. The principles underlying the determination of the at least one set of power classes and the generation of the indication message have already been explained above and will not be repeated here o avoid redundancy.

As shown in FIG. 8, the network node 22 comprises a radio interface 24 adapted to receive the indication message 16 and a processing circuitry 26 adapted to use the information provided by the indication message 16 for performing at least one operation in the network node 22 and.

As shown in FIG. 8, the processing circuitry 26 may comprise at least one of a memory 28 adapted to store the information provided by the indication message for use in a future time, a transmitting circuitry 30 adapted to transmit the information provided by the indication message 16 to another network node, a power class configuration circuitry 32 adapted to configure the wireless device 10 with a power class appropriate for an operative condition of the wireless device 10, an antenna configuration circuitry 34 adapted to vary the antenna configuration of the wireless device 10, a carrier configuration circuitry 36 adapted to vary the carrier configuration for the wireless device 10, a scheduling circuitry 38 adapted to schedule transmission signals to the wireless device 10 in an uplink and/or a downlink, and a power control circuitry 40 adapted to execute power control during communication with the wireless device 10. It should be noted that the interoperation of the circuitries comprised in the processing circuitry 26 is controlled by a controller 42.

Also, it should be noted that also a subset of the circuitries shown in FIG. 8 may be provided within the processing circuitry depending on the applicable operation scenario.

Preferably, the radio interface 24 may be adapted to receive the indication message 16 as capability report message.

Further, according to one example of the present invention the network node 22 is a base station node and the transmitting circuitry 30 is adapted to transmit the information provided by the indication message to a neighbouring base station or a core network node.

Further, the antenna configuration circuitry 34 is adapted to vary the antenna configuration of the wireless device 10 by changing the number of antennas used for transmission on the uplink and/or downlink.

Further, the carrier configuration circuitry 36 may be adapted to vary the carrier configuration by switching between single carrier operation and multicarrier operation. According to one example the carrier configuration circuitry 36 may be adapted to vary the multicarrier operation between carrier aggregation (CA) where the wireless device 10 can communicate with a plurality of serving cells or multi-connectivity (MC). According to another example the carrier configuration circuitry 36 may be adapted to increase or decrease the number of carriers used for communication between a main cell group (MCG) or a secondary cell group (SCG) and the wireless device 10.

Figure 9:
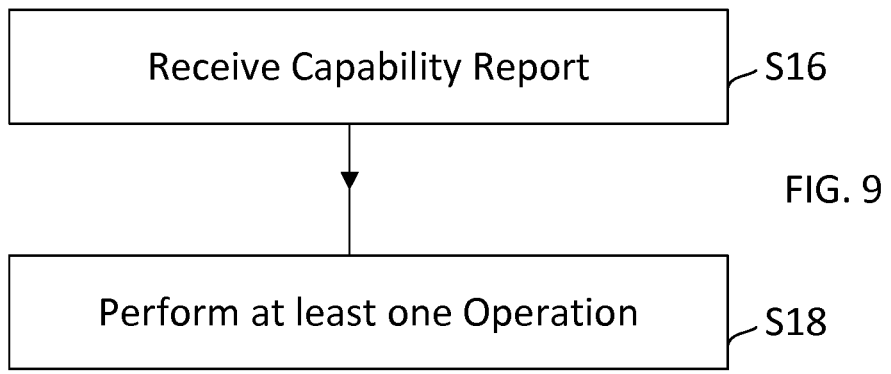
FIG. 9 shows a first flowchart of operation for the network node shown in FIG. 8.

FIG. 9 shows a first flowchart of operation for the network node shown in FIG. 8. The method shown in FIG. 9 is to receive multiple power classes from a wireless device 10 at a network node 22 communicating with the wireless device 10. As shown in FIG. 9, in a step S16, operatively executed by the radio interface 24, an indication message 16 is received from the wireless device 10 indicating at least one set of power classes defining at least two power classes of the wireless device 10. Each set of power classes applies to a transmission band supported by the wireless device 10 and each power class in each set of power classes applies to a specific operative condition of the wireless device 10.

As shown in FIG. 9, in a step S18, operatively executed by the processing circuitry 26, there is performed at least one operation in the network node 22 using the information provided by the indication message 16.

Figure 10:
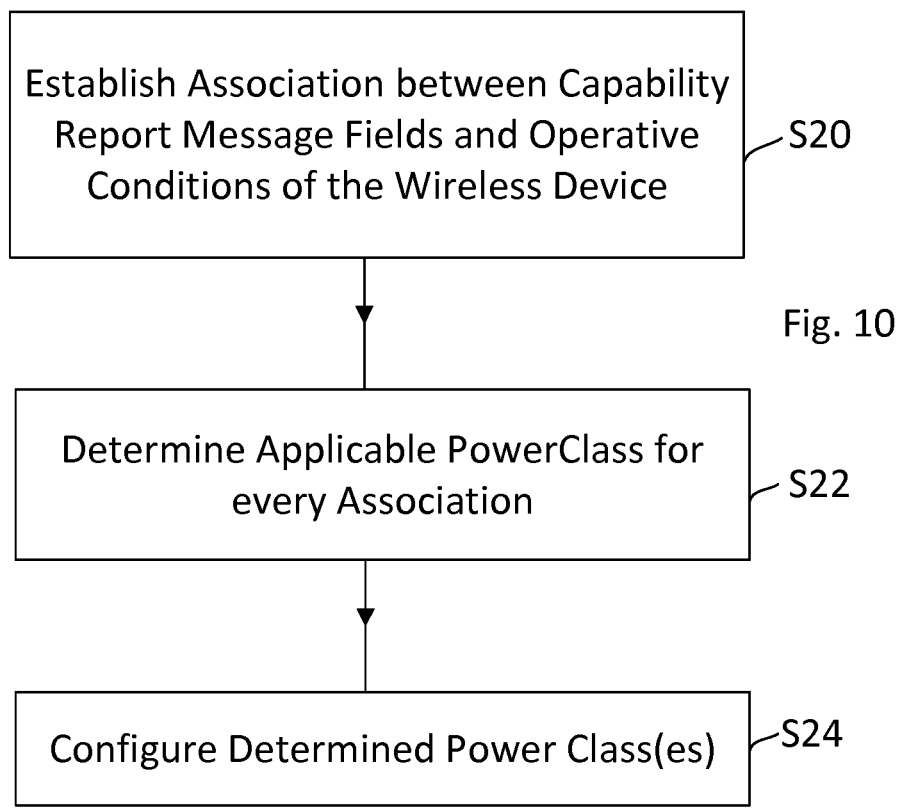
FIG. 10 shows a second flowchart of operation for the network node shown in FIG. 8.

FIG. 10 shows a second flowchart of operation for the network node shown in FIG. 8. In particular the FIG. 10 shows further details of using the information provided by the indication message 16.

As shown in FIG. 10, in a step S20, operatively executed by the power class configuration circuitry 32, there is established an association between every field 18, 20 of the indication message

16 used for transmission of the at least one set of power classes and a related operative condition of the wireless device 10.

As shown in FIG. 10, in a step S22, operatively executed by the power class configuration circuitry 32, there is determined an applicable power class for the wireless device 10 for every established association.

As shown in FIG. 10, in a step S24, operatively executed by the power class configuration circuitry 32, the determined power class (es) is (are) configured for the wireless device 10.

Figure 11:
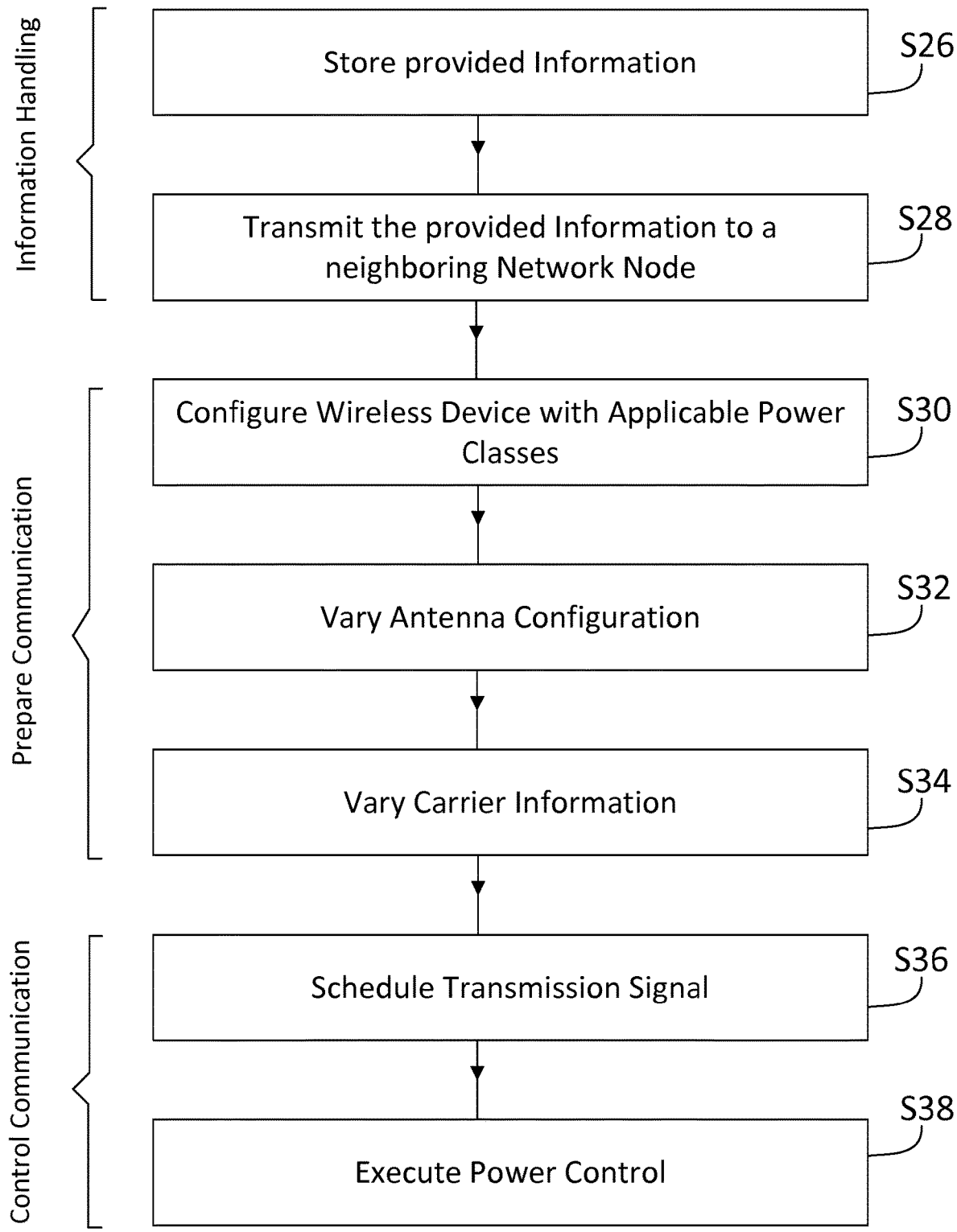
FIG. 11 shows a third flowchart of operation for the network node shown in FIG. 8.

FIG. 11 shows a third flowchart of operation for the network node shown in FIG. 8.

While the flowchart shown in FIG. 11 shows further details of operation of the network node it should be noted that the indicated sequence of the method steps is in no way binding for the present invention. Thus the sequence may be freely modified.

Also, some of the steps shown in FIG. 11 may as well be omitted.

Generally, the overall control on the functionality of the processing circuitry 26 is implemented through operation of the controller 42.

As shown in FIG. 11, in a step S26, operatively executed by the memory 28 under control of the controller 42, the information provided by the indication message 16 is stored in the memory 28 under control of the controller 42.

As shown in FIG. 11, in a step S28, operatively executed by the transmitting circuitry 30 under control of the controller 42, the information provided by the indication message 16 is transmitted to another network node. According to one example of the present invention the network node 22 may be a base station node and the information provided by the indication message 16 may be transmitted to a neighbouring base station or a core network node As shown in FIG. 11, in a step S30, operatively executed by the power class configuration circuitry 32 under control of the controller 42, applicable power classes for the wireless device 10 are determined and then the wireless device 10 is configured with a power class appropriate for an operative condition of the wireless device 10.

As shown in FIG. 11, in a step S32, operatively executed by the antenna configuration circuitry 32 under control of the controller 42, the antenna configuration of the wireless device 10 is varied. The step S32 may be executed to change the number of antennas used for transmission on the uplink and/or downlink As shown in FIG. 11, in a step S34, operatively executed by the carrier configuration circuitry 32 under control of the controller 42, the carrier configuration of the wireless device 10 is varied. The step S 34 may be executed to vary the carrier configuration by switching between single carrier operation and multicarrier operation. According to one example of the present invention the multicarrier operation is varied between carrier aggregation (CA) where the wireless device 10 can communicate with a plurality of serving cells or multi-connectivity (MC). Also, the number of carriers used for communication between a main cell group (MCG) or a secondary cell group (SCG) and the wireless device 10 may be increased or decreased.

As shown in FIG. 11, in a step S36, operatively executed by the scheduling circuitry 38 under control of the controller 42, transmission signals to the wireless device 10 in an uplink and/or a downlink are scheduled.

As shown in FIG. 11, in a step S38, operatively executed by the power control circuitry 40 under control of the controller 42, there is executed power control during communication with the wireless device 10.

Further to the above it should be noted that according to the present invention there are also provided computer programs comprising instructions which, when executed on at least one processor, cause the at least one processor to carry out the method of indicating multiple power classes from the wireless device to the network node and the method for receiving the indication at the network node 22 so as to perform the at least one operation while using the information provided by the indication message.

Also, according to the present invention there are also provided carriers containing the computer programs according to the present invention, wherein the carriers are one of an electronic signal, optical signal, radio signal, or computer readable storage medium.

While in the above, the present invention has been described with reference to the drawings and figures of preferred embodiments and examples of the invention, it should be noted that clearly the present invention may also be implemented using variations and modifications thereof which will be apparent and can be readily made by those skilled in the art without departing from the scope and spirit of the present invention. E.g., functionalities described above may be realized in software, in hardware, or a combination thereof.

Accordingly, it is not intended that the scope of claims appended hereto is limited to the description as set forth herein, but rather that the claims should be construed so as to encompass all features of presentable novelty that preside in the present invention, including all features that would be treated as equivalent thereof by those skilled in the art to which the present invention pertains.

The invention claimed is:

1. A wireless device configured to communicate with a network node, comprising:
  a processing circuitry adapted to:
    determine at least one set of power classes defining at least two power classes of the wireless device, wherein each set of power classes applies to a transmission band supported by the wireless device and each power class in each set of power classes applies to a specific operative condition of the wireless device; and
    generate an indication message according to a specification defining a first field for power class indication supplemented by at least one further field provided for another power class indication such that a first operative condition of the wireless device is associated with the first field and a second operative condition of the wireless device is associated with each further field, wherein each of the first operative condition and the second operative condition includes at least a number of carriers involved in a specific operation of the wireless device; and
  a radio interface adapted to transmit the indication message to the network node.

2. The wireless device according to claim 1, that supports a plurality of transmission bands, wherein the processing circuitry is adapted to determine the at least one set of power classes with respect to a subset of transmission bands where power class differentiation applies.

3. The wireless device according to claim 1, wherein the processing circuitry is adapted to determine the at least one set of power classes as a set comprising a default power class and a modified power class with respect to a subset of transmission bands where power class differentiation applies.

4. The wireless device according to claim 1, wherein the processing circuitry is adapted to determine the at least one set of power classes as a set comprising a single default power class with respect to a subset of transmission bands where power class differentiation is inapplicable.

5. The wireless device according to claim 1, wherein the processing circuitry is adapted to determine the at least one set of power classes as a set comprising a default power class and at least one dummy power class with respect to a subset of transmission bands where power class differentiation is inapplicable.

6. The wireless device according to claim 1, wherein the processing circuitry is adapted to determine the at least one set of power classes as a set comprising at least two identical power classes with respect to a subset of transmission bands where power class differentiation is inapplicable.

7. The wireless device according to claim 3, wherein the processing circuitry is adapted to generate the indication message such that the default power class is transmitted using the first field and the modified power class is transmitted using the at least one further field or wherein the indication message is generated such that the modified power class is transmitted using the first field and the default power class is transmitted using the at least one further field.

8. The wireless device according to claim 1, wherein the processing circuitry is adapted to generate the indication message as capability report message.

9. A network node configured to communicate with a wireless device, comprising:
  a radio interface adapted to receive an indication message from the wireless device indicating at least one set of power classes defining at least two power classes of the wireless device, wherein each set of power classes applies to a transmission band supported by the wireless device and each power class in each set of power classes applies to a specific operative condition of the wireless device, and wherein the indication message comprises a first field for power class indication supplemented by at least one further field provided for extended power class indication, different operative conditions of the wireless device are associated with the first field and the at least one further field; and a processing circuitry adapted to:
use information provided by the indication message for performing at least one operation in the network node;
establish an association between every field of the indication message and a related operative condition of the wireless device; and
determine an applicable power class for the wireless device for every established association.

10. The network node according to claim 9, wherein the processing circuitry comprises at least one of:
a memory adapted to store the information provided by the indication message for use in a future time;
a transmitting circuitry adapted to transmit the information provided by the indication message to another network node;
a power class configuration circuitry adapted to configure the wireless device with a power class appropriate for an operative condition of the wireless device;
an antenna configuration circuitry adapted to vary an antenna configuration of the wireless device;
a carrier configuration circuitry adapted to vary a carrier configuration for the wireless device;
a scheduling circuitry adapted to schedule transmission signals to the wireless device in at least one of an uplink or a downlink; and
a power control circuitry adapted to execute power control during communication with the wireless device.

11. The network node according to claim 10, wherein the network node is a base station node and the transmitting circuitry is adapted to transmit the information provided by the indication message to a neighbouring base station or a core network node.

12. The network node according to claim 10, wherein the antenna configuration circuitry is adapted to vary the antenna configuration of the wireless device by changing a number of antennas used for transmission on the at least one of the uplink or the downlink.

13. The network node according to claim 10, wherein the carrier configuration circuitry is adapted to vary the carrier configuration by switching between single carrier operation and multicarrier operation.

14. The network node according to claim 13, wherein the carrier configuration circuitry is adapted to vary the multi-carrier operation between carrier aggregation (CA) where the wireless device can communicate with a plurality of serving cells or multi-connectivity (MC).

15. The network node according to claim 13, wherein the carrier configuration circuitry is adapted to increase or decrease a number of carriers used for communication between a main cell group (MCG) or a secondary cell group (SCG) and the wireless device.

16. The network node according to claim 9, wherein the radio interface is adapted to receive the indication message as capability report message.

17. A method of indicating multiple power classes from a wireless device to a network node communicating with the wireless device, comprising:
determining at least one set of power classes defining at least two power classes of the wireless device, wherein each set of power classes applies to a transmission band supported by the wireless device and each power class in each set of power classes applies to a specific operative condition of the wireless device;
generating an indication message according to a specification defining a first field for power class indication supplemented by at least one further field provided for another power class indication such that a first operative condition of the wireless device is associated with the first field and a second operative condition of the wireless device is associated with each further field, wherein each of the first operative condition and the second operative condition includes at least a number of carriers involved in a specific operation of the wireless device; and
transmitting the indication message to the network node.

18. A method of receiving multiple power classes from a wireless device at a network node communicating with the wireless device, comprising:
receiving an indication message from the wireless device indicating at least one set of power classes defining at least two power classes of the wireless device, wherein each set of power classes applies to a transmission band supported by the wireless device and each power class in each set of power classes applies to a specific operative condition of the wireless device, and wherein the indication message comprises a first field for power class indication supplemented by at least one further field provided for extended power class indication, different operative conditions of the wireless device are associated with the first field and the at least one further field;
performing at least one operation in the network node using information provided by the indication message;
establishing an association between every field of the indication message and a related operative condition of the wireless device; and
determining an applicable power class for the wireless device for every established association.

* * * * *